(12) United States Patent
Drap

(10) Patent No.: US 7,252,126 B2
(45) Date of Patent: Aug. 7, 2007

(54) DEVICE DESIGNED TO BE FITTED AROUND A WHEEL RIM AND COMPRISING CENTERING MEANS

(75) Inventor: Sebastien Drap, Dallet (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 263 days.

(21) Appl. No.: 10/178,164

(22) Filed: Jun. 24, 2002

(65) Prior Publication Data

US 2003/0005991 A1 Jan. 9, 2003

Related U.S. Application Data

(63) Continuation of application No. PCT/EP00/13125, filed on Dec. 21, 2000.

(30) Foreign Application Priority Data

Dec. 23, 1999 (FR) .................. 99 16437

(51) Int. Cl.
B60C 17/06 (2006.01)
B60C 17/04 (2006.01)
(52) U.S. Cl. ..................... 152/158; 152/520
(58) Field of Classification Search ............. 152/158, 152/520, 381.5, 381.6, 382, 384, 388, 323, 152/393–395, 399–401
See application file for complete search history.

(56) References Cited

U.S. PATENT DOCUMENTS 2,525,196 A * 10/1950 Bacon ................ 152/323
2,701,971 A * 2/1955 Carter et al. ............ 152/323 X
3,141,491 A * 7/1964 Ludewig et al. ............ 152/323
3,857,427 A * 12/1974 Soucek .................. 152/158 X
4,197,892 A   4/1980 Boileau
4,248,286 A   2/1981 Curtiss, Jr. et al.
4,252,170 A   2/1981 Watts
4,590,980 A * 5/1986 Kuhn ..................... 152/323
5,579,818 A * 12/1996 Hoppenheit et al. ........ 152/393
5,634,993 A   6/1997 Drieux et al.
5,690,762 A   11/1997 Bock et al.
5,891,279 A   4/1999 Lacour
6,598,633 B1 * 7/2003 Pompier et al. ............ 152/158

FOREIGN PATENT DOCUMENTS

| DE | 1605534 | 5/1971 |
| DE | 198 37 712 A1 * | 3/2000 |
| EP | 0 159 274 A2 * | 10/1985 |
| EP | 0 298 854 A1 * | 1/1989 |
| EP | 0796747 | 9/1997 |
| FR | 2393689 | 1/1979 |
| FR | 2771340 | 5/1999 |
| GB | 2 238 513 A * | 6/1991 ............ 152/520 |
| JP | 05139110 A * | 6/1993 |
| JP | 07149118 | 6/1995 |
| JP | 07149118 A * | 6/1995 |
| JP | 08118903 A * | 5/1996 |

* cited by examiner

Primary Examiner—Adrienne C. Johnstone
(74) Attorney, Agent, or Firm—Buchanan Ingersoll & Rooney PC

(57) ABSTRACT

A device, such as a safety support, comprising a body and a base, in which the base comprises at least one zone of resistance which is essentially circumferentially inextensible and is mechanically coupled to the body, and at least one centering zone which is mechanically joined to the resistance zone by connections with low tensile rigidity and so to be mechanically uncoupled from the body.

11 Claims, 4 Drawing Sheets

DEVICE DESIGNED TO BE FITTED AROUND A WHEEL RIM AND COMPRISING CENTERING MEANS

CROSS REFERENCE TO RELATED APPLICATIONS

This is a continuation of international application PCT/EP00/13125 filed Dec. 21, 2000, which was published in French as international publication WO 01/47729 A1 on Jul. 5, 2001.

BACKGROUND OF THE INVENTION

1. Technical Field of the Invention

The present invention concerns devices intended to fit around a wheel rim, such as safety supports for vehicle tires, sensors, or automatic inflation systems and, more particularly, to the connection between such devices and the rims around which they are mounted.

2. The Related Art

The main function of tire safety supports is to support the load in the event that the tire suffers a major pressure loss. When tires are inflated normally, the safety supports must not have any adverse effect on the dynamic properties of the tire. In particular, they must remain well centered around the rim; that is to say, the rotational axes of the safety support and of the rim must remain one and the same to avoid any out-of-balance effect, and this, whatever the temperature of the support and the vehicle's rolling speed. It must also be possible to mount the safety supports around the wheel rims of vehicles and take them off again in an easy way, i.e., using limited forces which make it possible to fit and remove them by hand.

U.S. Pat. No. 5,690,762 discloses a safety support made of an elastic material designed to be fitted on the wheel rim of a touring vehicle, the rim being of the usual, drop-center type. This support comprises a body with a crown designed to come into contact with the crown of the tire if the latter should lose pressure, and a base designed to come into contact with the rim. This support also comprises annular reinforcement elements oriented circumferentially and essentially inextensible, whose diameter is slightly larger than the diameter of the rim hooks for which the support is provided. The base consists of two annular zones whose inside diameter in the free state is smaller than that of the parts of the rim upon which they are to rest: the compression of these annular zones therefore ensures good centering of the support on the rim. The function of the annular reinforcing elements is, in particular, to prevent the annular zones of the base from extending under the action of centrifugal forces at high speed until contact with the rim is lost.

When a safety support is intended to be fitted to a two-part rim or a rim having a bearing surface for a support whose diameter is larger than that of one of the rim hooks as shown in FIG. 1, the annular reinforcing elements can be arranged in the base. This is so in the case of the support disclosed by U.S. Pat. No. 5,891,279. Such a position of the annular reinforcing elements facilitates the construction of the support.

For such a support, bearing in mind the manufacturing tolerances of the rim and the support itself, it is no longer possible to arrange annular zones radially on the inside whose compression will ensure good centering around the rim regardless of the speed while also ensuring easy fitting and removal.

SUMMARY OF THE INVENTION

The subject of the invention is a device, such as a safety support, which is intended to be fitted on a wheel rim by an operation of translation relative to a bearing surface of the wheel rim, comprising:

an essentially cylindrical base designed to fit around the rim, with a zone of resistance which is essentially circumferentially inextensible and whose radially internal diameter is slightly larger than the diameter of the rim's bearing surface for the support, the base also comprising means for centering the support relative to the rim, and a body attached to the base.

This device is characterized in that the base comprises at least one centering zone mechanically coupled to the zone of resistance by connections of low rigidity in extension, i.e., low tensile rigidity, and therefore effectively mechanically uncoupled from the body and thus from the resistance zone of the base which is connected to the body, and in that the radially interior surface of the centring zone, in the free state, has a diameter smaller than that of the rim's bearing surface for the support.

The centering zone has a radially internal diameter smaller than that of the rim's bearing surface for the support. Consequently, during the fitting of the support around the rim, the centering zone generates radial forces which center the support around the rim. When rolling at high speed, the mechanical coupling between the zone of resistance in the base of the support and the body implies that it is the zone of resistance which takes up almost all of the centrifugal forces due to speed applied to the body. The mechanical uncoupling between the centering zone and the body implies that the centering zone will be unaffected, or almost unaffected, by the forces due to speed applied to the body. Consequently, the variation of the radial forces between the centering zone and the rim as a function of the speed will be very small or even negligible.

The device according to the invention, which comprises a body and a base, is a unitary device designed to be fitted around a rim's bearing surface for a support in a single operation of translation relative thereto. Only one such operation is needed, and this can be carried out easily by applying low forces determined by the dimensioning of the centering zone, and in a very short time.

According to a preferred embodiment, the centering zone consists of a continuous circumferential element joined to the zone of resistance by a connection designed to develop flexion-compression forces during the fitting of the support to its bearing surface of the rim.

The continuous circumferential element may comprise a reinforcement armature.

The centering zone can also consist of a plurality of protuberances joined circumferentially by a reinforcement armature, the reinforcement armature being circumferentially continuous.

The presence of a reinforcement armature contributes towards keeping the centering forces essentially constant over a wide range of temperatures and rolling speeds.

The centering zone may extend axially beyond the body.

The zone of resistance to centrifugal force may comprise a reinforcement armature that is circumferentially inextensible, with reinforcing elements orientated circumferentially or at angles between 10° and 40°. If necessary, the armature may also comprise reinforcement elements orientated axially.

BRIEF DESCRIPTION OF THE DRAWINGS

Several embodiments of the invention will now be described, taking as an example device a safety support, with reference to the attached drawings, in which.

DETAILED DESCRIPTION OF EXEMPLARY EMBODIMENTS

Figure 1:
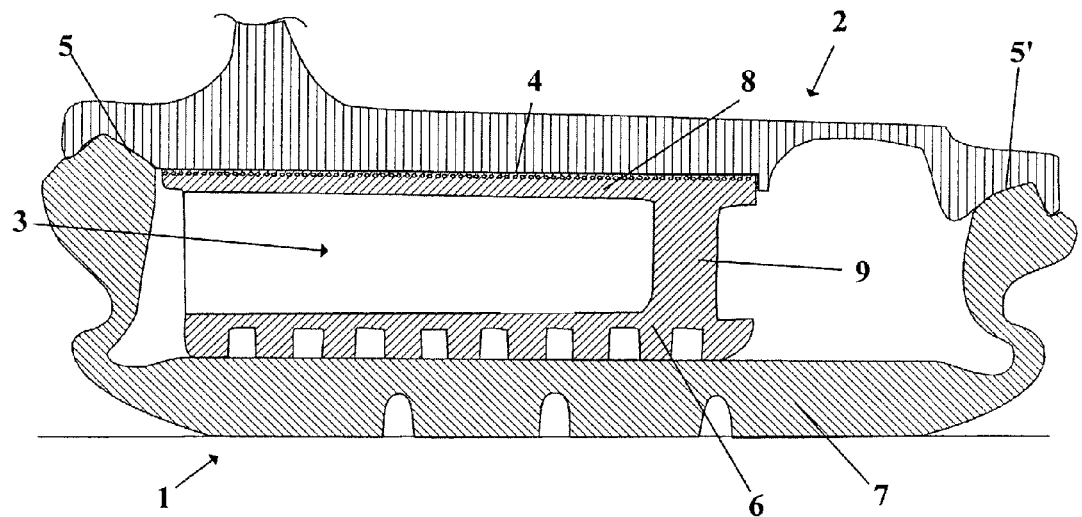
FIG. 1 is a partial axial cross-sectional view of a fitted assembly comprising a safety support.

FIG. 1 shows a fitted assembly comprising a tire 1, a wheel rim 2 and a safety support 3 arranged around the bearing surface 4 of the rim 2. The geometry of the wheel rim 2 is in particular described in U.S. Pat. No. 5,634,993, the disclosure of which is hereby incorporated by reference. It has two bead seats, one external 5 and one internal 5', of different diameters, and is particularly suitable for the easy fitting of the safety support 3. The assembly enables rolling to continue despite considerable pressure loss from the tire 1. The safety support 3 comprises two main portions, a body 9 with a crown 6 designed to come into contact with the tread 7 of the tire 1 in the case of zero or very low inflation pressure—which is what is shown in FIG. 1—and a base 8 designed to surround the bearing surface 4 of the rim 2. The shape of the body may be extremely varied.

Figure 2:
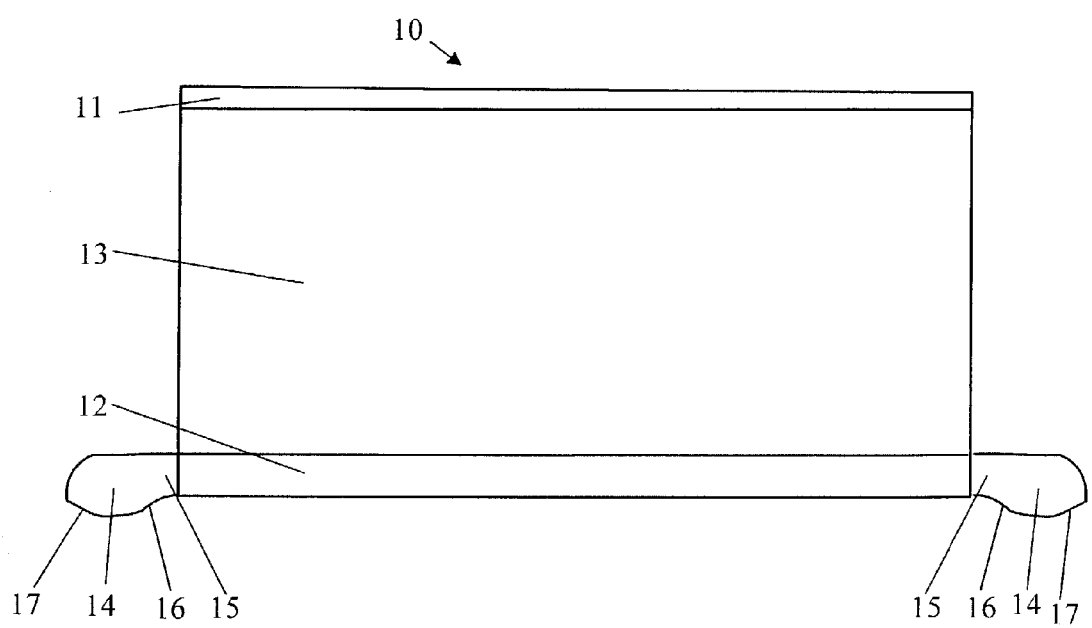
FIG. 2 is an axial cross-sectional view of an embodiment of a support.

FIG. 2 shows a support according to the invention, whose base and body consist essentially of an elastomer material based on natural or synthetic rubber, or any other elastic material such as the polyurethane elastomers. These materials have moduli of elasticity usually ranging from 1 to 50 MPa (secant tensile moduli at 20° C. and at a deformation of 10%). The support 10 consists of a body 13 with a crown 11 and a base 12. The base 12 comprises a reinforcement armature which is essentially inextensible circumferentially and is designed to take up the centrifugal forces on the support at high speeds. This base 12 also comprises centering means 14, 15 mechanically uncoupled from the body 13 of the support. The centering means are a continuous flange 14 of essentially cylindrical shape connected to the zone of the base 12 joined to the body 13 by a connection 15 of smaller cross-section and thus low extension rigidity. These means are arranged axially on either side of the base 12 of the support 10 to obtain effective holding of the support 10 around the rim. In some cases, the centering means may also be arranged only on that side of the support which is the last to be pushed over the bearing surface 4 of the rim 2. This limits the friction forces between the support and the bearing surface 4 during fitting.

The flange 14 has an inside diameter smaller than the diameter of the rim's bearing surface 4. During fitting, it is subjected to circumferential stretching which ensures that the support 10 is centered on the rim's bearing surface 4. The connections 15 are subjected to flexion-compression during the fitting of the support 10 around the rim 2. During rolling, in view of the very low mass of the flange 14 and its effective mechanical uncoupling from the zone of resistance of the base defined by the reinforcement armature, the centrifugal forces acting on the support are mainly exerted on the body 13 and are imposed on the zone of resistance of the base 12, causing it to stretch circumferentially to a greater or lesser extent. This extension will have almost no consequence on the circumferential extension of the flange 14. It can therefore be said that the support 10 has in its base 12 a zone of resistance designed to take up the centrifugal forces on the support and a centering zone designed to ensure centering within a very large range of rolling speeds.

The flange 14 may also have chamfers 16 and 17 located axially on the inside 16 and outside 17 relative to the contact surface between the flange 14 and the bearing surface 4 of the rim 2, to facilitate the positioning and/or removal of the support 10 on or from the bearing surface 4. These chamfers 16, 17 may have various shapes; for example they may have a truncated-cone generatrix inclined between 20° and 50° away from the axial direction.

Figures 3A, 3B:
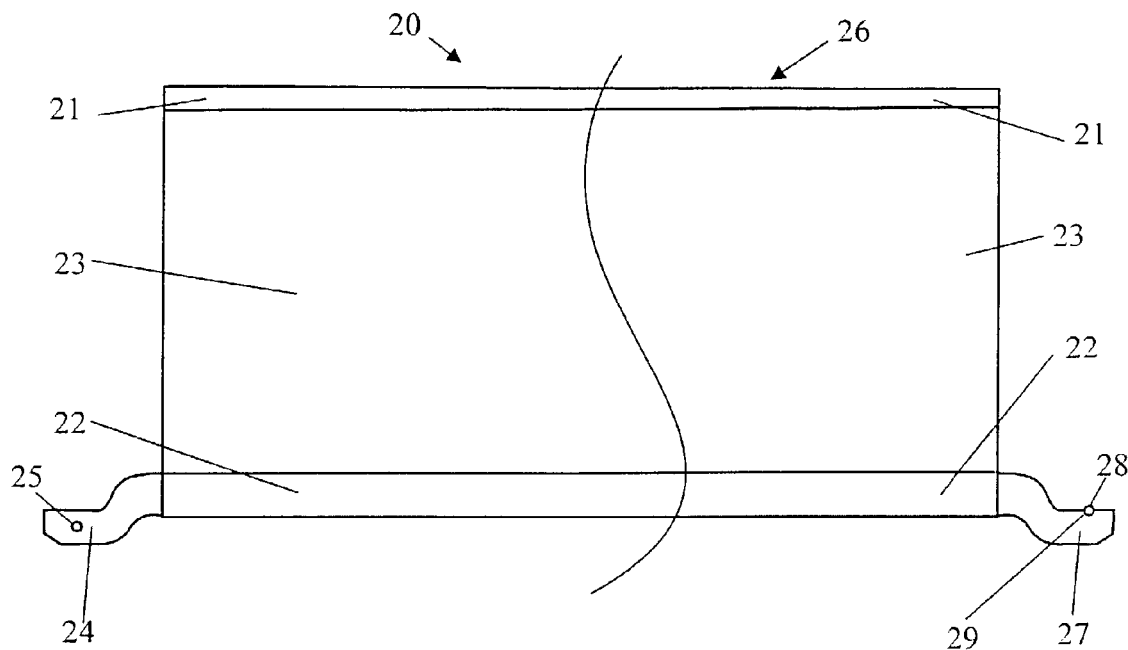
FIGS. 3a and 3b show two other embodiments of the centering means of a support.

FIGS. 3a and 3b show safety supports 20 and 26 with two other embodiments of the centering means. The centering means of the support 20 (FIG. 3a) consist of a circumferentially continuous cylindrical flange 24 and comprise a reinforcement armature 25 which is also circumferential. This reinforcement armature 25 is embedded in the cylindrical flange 24 and has a winding diameter slightly larger than that of the bearing surface 4 of the rim 2. It allows good control of the centering forces and maintains them at an essentially constant level regardless of the rolling speed and the temperature.

The centering means of the support 26 (FIG. 3b) also consist of a circumferentially continuous cylindrical flange 27 and a circumferential reinforcement armature 28. The armature 28 is arranged in a groove 29 of the radially outer surface of the flange 27.

Figure 4:
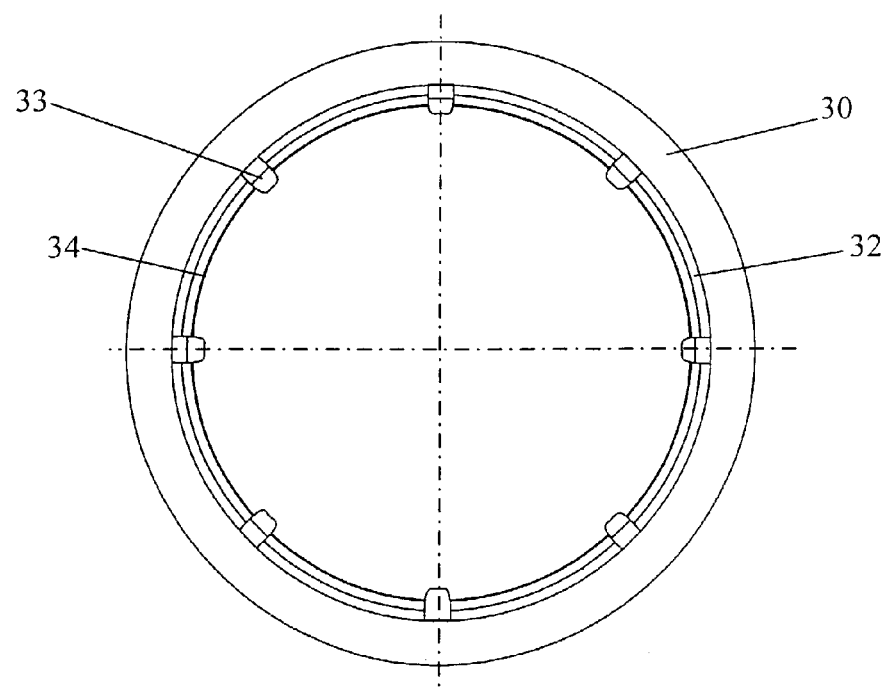
FIG. 4 is a side view of a particular embodiment of a support.

FIG. 4 is a side view of another embodiment of the centering means. In this example, the centering means of the support 30 comprise a continuous reinforcement armature 34 held in place axially by a plurality of protuberances 33 distributed regularly around the circumference of the base 32 of the support. The cross-section of the protuberances 33 is similar to that of the continuous flange 27 of FIG. 3b. The number of protuberances 33 is about 20 to 40.

This version (FIG. 4) of the centering means can be used for materials constituting the base (and perhaps also the body) of the support that have relatively high moduli, for example a diene elastomer or polyurethane with a modulus higher than 20 MPa. It is, however, particularly appropriate when the material used is a thermoplastic, such as a polyamide, which has a modulus of elasticity higher than 1 GPa at 20° C. In the latter case, the rigidity of the material is such that the base of the support need no longer systematically comprise a reinforcement armature designed to take up the centrifugal forces produced at high speed.

Figure 5:
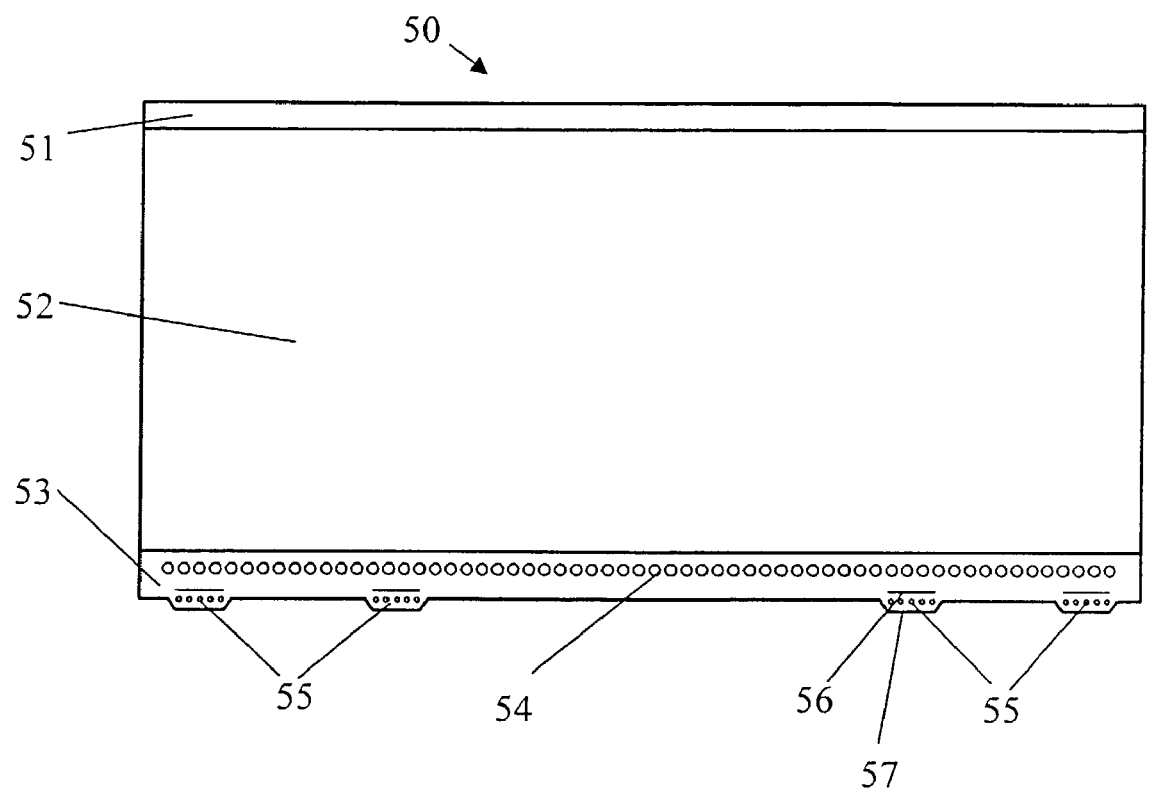
FIG. 5 is an axial cross-sectional view of a fourth embodiment of a support according to the invention.
Figure 6:
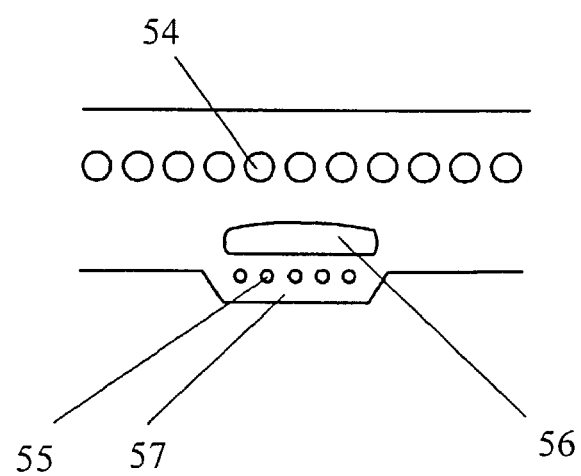
FIG. 6 is an enlarged view of the centering zone of the support shown in FIG. 5.

Another embodiment of a support 50 according to the invention is shown in FIG. 5. The support 50 comprises a body 52 with a crown 51 and a base 53. A reinforcement armature 54 is embedded in the base 53, and defines the resistance zone of the base 53. The reinforcement armature 54 has very little circumferential extensibility and is designed to take up the centrifugal forces of the support 50 during rolling. The base 53 also comprises centering zones 57, four of these being shown in FIG. 5. In these zones 57, the radially internal diameter is slightly smaller than the diameter of the inside surface of the base 53. This makes it possible for the only permanent contact with the rim to be under the centering zones. The centering zones 57 are each circumferentially continuous and comprise a second reinforcement armature 55 designed to develop acceptable forces during fitting onto the rim's bearing surface. The extension of the second reinforcement armature 55 around the rim's bearing surface produces the centering forces required to maintain contact between the support and the rim's bearing surface having the same rotational axis. Radially outside the armature 55, and thus outside the centering zones 57, there are radial uncoupling zones 56. These zones allow the centering zones 57 to be mechanically uncoupled from the resistance zone connected to the armature 54. For example, the radial uncoupling zones 56 have no connection between their radially inside and outside surfaces. During rolling at high speed, the centrifugal forces result in a certain extension of the armature 54, and in turn this causes the two inside and outside surfaces of the radial uncoupling zones 56 to move apart. The extension of the armature 54 will have virtually no effect on the stress on the reinforcement armatures 55 in the centering zones 57. These two zones are indeed mechanically uncoupled.

The uncoupling zone can be obtained by inserting a flat, closed tube when the materials are introduced into the mold used to make the support. A sheet of some non-adherent material (Teflon, a layer of parting agent on the surface, etc.) may also be arranged along the line of the centering zones in the mold.

An uncoupling zone may also be formed by a layer of a material whose modulus is much smaller than those of the materials around it.

The flexion-extension rigidity of the connections 15, for example (see FIG. 2), must enable the safety support to have an intrinsic vibration frequency when loaded along the vertical axis that is much higher than the rotation frequency range in vehicles (about 0 to 50 Hz), in order to avoid the generation of out-of-balance effects during rolling. The minimum rigidity imparted to the connection zone must be determined by knowing the mass of the safety support considered and the intrinsic frequency desired. Preferably, the intrinsic frequency chosen will be above 200 Hz. In the case of a support weighing 3 kg and comprising a centering zone that consists of 36 protuberances (see FIG. 4), a radial rigidity of 4 daN/mm for each of the protuberances gives an intrinsic frequency higher than 500 Hz.

Figure 7:
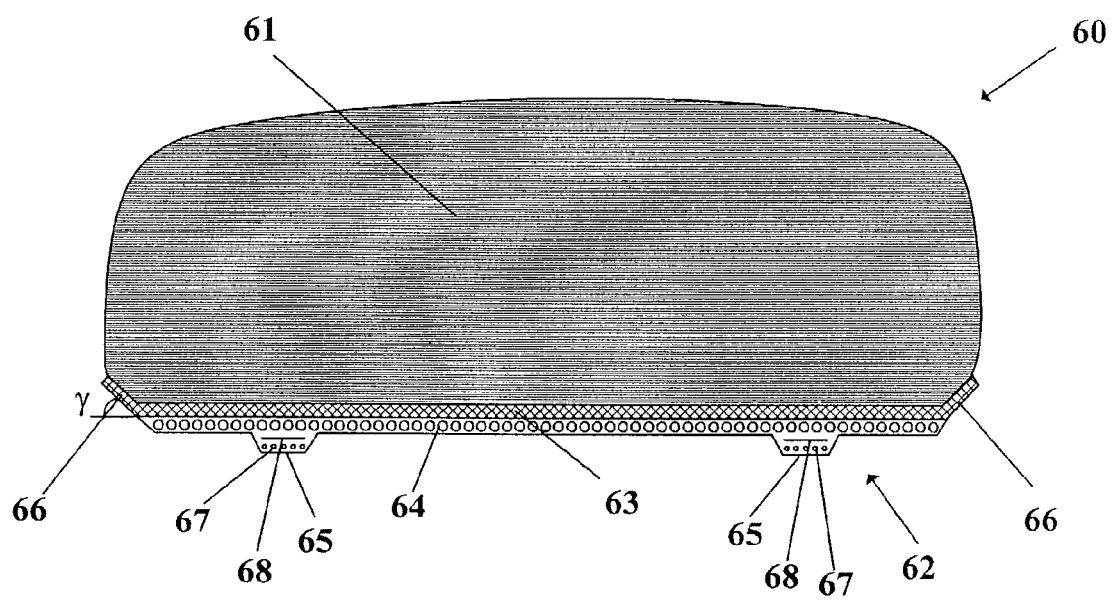
FIG. 7 is an axial cross-sectional view of another support according to the invention.

FIG. 7 shows an axial section of a support 60 according to the invention, whose body 61 consists of a sausage-like structure made of alveolar rubber with closed cells. This body 61 may be associated, in particular by adhesive bonding, with any of the bases described earlier equipped with centering means. In the example of FIG. 7, the centering means of the base 62 are similar to those of FIG. 5. The base 62 comprises an armature of reinforcing elements 63 orientated essentially axially, and a first armature of annular reinforcing elements 64 embedded in the base 62. The base also comprises centering zones 65, two of these being shown. These zones 65 are circumferentially continuous and comprise a second armature of annular reinforcing elements 67 designed to develop acceptable forces during fitting onto the bearing surface of the rim. As before, radially outside the centering zones 65 there are radial uncoupling zones 68. The base 62 is extended axially on both sides by wings 66. These wings may contain only the armature of reinforcing elements 63 orientated essentially axially, and have an inclination relative to the axial direction of between 30° and 50°. The wings 66 are adhesively bonded to the body 61 and assist the maintenance of its lateral position during inflated rolling at high speed. The base 62 and the body 61 are bonded using the customary adhesives.

The reinforcement armatures of the resistance zones of the supports according to the invention may consist of reinforcing elements such as wires, cables, assemblies or any such like, for example made of aramide or nylon. The reinforcement armatures may also consist of a circumferential winding of reinforcing elements in one or more layers, and may also be a crossed double-ply whose reinforcing elements are orientated at angles ±; of the order of 10° to 40° relative to the circumferential direction, to ensure good resistance of the support to centrifugal forces during high-speed rolling. When the bearing surface of the rim consists of two cylindrical zones separated by a circumferential groove to lighten the structure, the reinforcement armature of the base can also advantageously be supplemented by a structure of reinforcing elements orientated axially. This improves the performance of the support on the limited bearing surface. The reinforcement armatures of the centering zones are entirely similar, with a tensile rigidity designed to allow easy fitting of the support onto the rim.

What is claimed is:

1. In combination, a wheel rim and a safety support configured to be fitted by an operation of relative translation around a bearing surface of the wheel rim, the safety support comprising an essentially cylindrical base configured to fit around the rim, and a body connected to the base, wherein the base comprises a zone of resistance which is essentially circumferentially inextensible and is mechanically coupled to the body and at least one centering zone mechanically coupled to the zone of resistance by a connection having low tensile rigidity so as to be effectively mechanically uncoupled from the zone of resistance, and wherein the radially inside surface of the at least one centering zone, in the free state, has a diameter smaller than that of the resistance zone and smaller than the diameter of the bearing surface of the wheel rim; the at least one centering zone comprising a circumferentially continuous flange of essentially cylindrical shape, the flange extending axially beyond both the body and the zone of resistance and being connected to the zone of the base joined to the body by a joint which develops flexion-compression forces during the fitting by an operation of relative translation of the safety support to the support bearing surface of the rim; the base and the body being essentially made of an elastomer material.

2. A combination according to claim 1, in which the circumferentially continuous flange comprises a reinforcement armature.

3. A combination according to claim 2 in which the reinforcement armature has circumferentially orientated reinforcing elements.

4. A combination according to claim 2, in which the reinforcement armature has reinforcing elements orientated at angles between 10° and 40 relative to the circumferential direction.

5. A combination according to claim 3 or 4, in which the reinforcement armature of the resistance zone additionally comprises reinforcing elements orientated axially.

6. A combination according to claim 2, in which the centering zone comprises a plurality of protuberances circumferentially connected by the reinforcement armature.

7. A combination according to claim 6, in which the material constituting the base of the device has a modulus of elasticity at 20° C. greater than or equal to 1 GPa.

8. A combination according to claim 7, in which the material constituting the base is a thermoplastic.

9. A combination according to claim 1, in which the radial rigidity of the connections is such that the intrinsic frequency of the said device is higher than 200 Hz.

10. A combination according to claim 1, in which the body comprises a sausage-like structure of essentially toric shape made of closed-cell alveolar rubber.

11. A combination according to claim 10, in which the base is extended axially on both sides by a wing extending radially towards the outside with an angle between 30° and 50° relative to the axial direction.

* * * * *